(12) United States Patent
Cross

(10) Patent No.: US 6,331,091 B2
(45) Date of Patent: Dec. 18, 2001

(54) CONTROL-ROD ACTUATED AXLE ASSEMBLY

(76) Inventor: Gary A. Cross, 5106 W. Roberts Dr., Santa Ana, CA (US) 92704

( * ) Notice: Subject to any disclaimer, the term of this patent is extended or adjusted under 35 U.S.C. 154(b) by 0 days.

(21) Appl. No.: 09/796,582

(22) Filed: Feb. 28, 2001

Related U.S. Application Data

(63) Continuation of application No. 09/218,716, filed on Dec. 22, 1998, now abandoned.

(51) Int. Cl.$^7$ ...................................................... F16B 1/00
(52) U.S. Cl. ........................ 403/322.2; 403/325; 403/316
(58) Field of Search ................................... 403/325, 321, 403/322.1, 322.2, 324, 315, 316, 317, 328; 301/5.3

(56) References Cited

U.S. PATENT DOCUMENTS

| | | |
|---|---|---|
| 3,038,567 | 6/1962 | Poddig et al. . |
| 3,277,767 | 10/1966 | Allen et al. . |
| 3,507,528 | 4/1970 | Desmarchais . |
| 3,884,589 | 5/1975 | Liedholm . |
| 3,945,744 | 3/1976 | Metz . |
| 4,453,449 | 6/1984 | Hollmann . |
| 4,616,952 | 10/1986 | Schott . |
| 4,645,372 | 2/1987 | Suzuki . |
| 4,865,485 | 9/1989 | Finnefrock, Sr. . |
| 4,900,182 | 2/1990 | Stillwagon . |
| 4,988,248 | 1/1991 | Flux . |
| 5,390,571 | 2/1995 | Fox, III et al. . |
| 5,398,946 | 3/1995 | Quiring . |
| 5,458,431 | 10/1995 | Ferreol-Ragotin . |
| 5,464,300 | 11/1995 | Crainich . |
| 5,518,335 | 5/1996 | Dobbins . |
| 5,531,140 | 7/1996 | Chow . |
| 5,658,087 | 8/1997 | Butkovich et al. . |
| 5,692,851 | 12/1997 | Pace . |
| 5,807,007 | 9/1998 | Stemper . |
| 6,007,268 | 12/1999 | Whittington et al. . |

Primary Examiner—Lynne H. Browne
Assistant Examiner—John R. Cottingham
(74) Attorney, Agent, or Firm—Gene Scott-Patent Law & Venture Group

(57) ABSTRACT

An axle is made-up of a left and a right axle halves which axially engage to form a completed axle assemble for supporting a roller skate wheel or other rotating member. A control rod is positioned and enabled for axial translation within the axle and may be moved by physical contact with the rod through an access hole at one end of the axle. A spring normally positions the control rod so that a set of ball bearings mounted within radial holes in the axle are forced into outward positions for engaging the axle halves to form a unitary unit. When the control rod is translated against spring tension, however, the bearings are able to move radially inwardly so as to disengage the axle halves for quick disassembly for replacing a wheel or other need. The axle provides a spring bias enabled for forcefully separating the axle halves once released. A threaded cap is adjustable in its position to moderate the separating force.

3 Claims, 2 Drawing Sheets

CONTROL-ROD ACTUATED AXLE ASSEMBLY

This application is a continuation in part of a previously filed utility patent application having Ser. No. 09/218,716 and an assigned filing date of Dec. 22, 1998 abandoned and which contains subject matter substantially the same as the present application.

BACKGROUND OF THE INVENTION

1. Field of the Invention

This invention relates generally to wheel axles, and more particularly to such an axle capable of being disassembled and reassembled by snapping two halves of the device apart or together respectively.

2. Description of Relate Art

The following art defines the present state of this field:

Poddig et al., U.S. Pat. No. 3,038,567 describes a telescopic antenna movable between a collapsed and extended position, in combination, a tubular outer section formed in its inner surface with a recess; an inner antenna section arranged in the collapsed position of the antenna entirely in said outer section and slidable in longitudinal direction thereof to an extended position; a head also arranged in the collapsed position of the antenna in said outer section and being connected to said inner section for movement therewith, said head being formed with a stepped longitudinal bore having an inner small diameter portion and at its outer end a large diameter portion, and said head being formed with a transverse bore communicating with said small diameter portion, and said head being formed with a transverse bore communicating with said small diameter bore portion for longitudinal movement relative to said head, said holding member being spring biased into holding position; a locking member arranged in said transverse bore portion and cooperating with said holding member so as to be urged outwardly thereby, when said holding member is in said holding position thereof, into a locking position wherein said locking member projects into said recess of said outer section; and key means having a stem portion and a bit portion projecting radially from said stem portion spaced from the free end of the end of the latter, said key means being movable between and active position in which said stem portion thereof is located in said small diameter bore portion and engages said holding member for moving the same longitudinally out of said holding position, thereby permitting said locking member to leave said locking position and in which said bit portion is out of alignment with said keyhole-shaped opening and engages said closure plate to hold said key means in said inner section out of said outer section, and an inactive position in which said bit is aligned with said keyhole-shaped opening so that said key means may be withdrawn from said longitudinal bore.

Allen et al, U.S. Pat. No. 3,277,767 describes a quick release pin which consists of a main body, or head, made of quality steel. The shape is optional and preferably generally cylindrical and has a stepped cylindrical passage extending longitudinally throughout its length. The fore end of the passage is a counterbore of substantial depth and the aft end of the hollow shank fits closely in the counterbore. The shank is permanently secured or bounded in place by the use of meltable metal; that is, may be welded or brazed, including the type of brazing known as "sweating." Instead of forming the head with an integral lateral handle by machining or forging, or welding a handle to it, the hollow head is cross bored to form a lateral passage and extends into and preferably through the longitudinal passage. The handle portion which is located within the longitudinal passage is then swaged to modify its shape and prevent it from being removed through the lateral passage. Thus it effectively becomes integral with the head without the necessity of welding or similar operations. In the presently preferred form it is swaged sufficiently to make it conform at least partially to the cylindrical shape of the longitudinal passage, thus preventing rotation as well as axial movement. A central opening is formed in the handle portion and a spring loaded spindle extends through it and through the guideway in the hollow shank to operate conventional lock balls. In a modification of the invention, the intermediate and aft portions of the longitudinal passage in the head are larger than the fore portion. The shank is formed with a cylindrical abutment at its aft end and the shank is inserted forwardly through the head, being pressed tightly into the forward portion of the longitudinal passage until the abutment seats on the shoulder formed at the juncture of the passage portions of different diameters. The fit may be made so tight that nothing additional is needed to make the connection permanent. The lateral passage is formed immediately behind the abutment, and a handle is inserted and swage locked in substantially the same way as in the first embodiment. The shank cannot move rearwardly. The abutment may have a trough shaped aft face partially surrounding the handle, which very effectively prevents any rotation of the shank.

Desmarchais, U.S. Pat. No. 3,507,528 describes a locking mechanism using a pair of locking longitudinal members with a locking device formed on the adjacent inner parts of the members for coupling them together. One of the members is annular with an element extending through it to position the coupling device in locked arrangement and is moveable to decouple the elements.

Liedholm, U.S. Pat. No. 3,884,589 describes a locking joint for concrete piles. Facing end surfaces are joined by outwardly projecting pins or openings communicating with pin receiving spaces. The receiving spaces and each pin has a transverse hole to receive a wedge device inserted in the hole and through a bore projecting through the side of the pile sections into which the pin is inserted. This holds the pile sections in firm abutting relationship.

Metz, U.S. Pat. No. 3,945,744 describes an extendable and collapsible telescoping strut construction comprising inner and outer tubular members adapted to be slidably received in one another. The inner member is provided with rolled-in portions constituting annular locking grooves, respectively. The outer member has radially extending slots to receive locking dogs which are advanceable toward the inner member in predetermined, fixed positions with respect to the outer member. The latter further carries a springbiased, slidable collar member which retains the locking dogs in positions of engagement with any one of the annular grooves. Positive, cooperable locking means on the collar member and on the outer tubular member are provided for retaining these two parts in a predetermined, fixed position against accidental bumping or jarring, whereby the locking dogs are fly held in their advanced, locking positions. The arrangement is such that the spring automatically advances the collar member to its locked position with respect to the outer tubular member as soon as the collar member is released.

Hollmann, U.S. Pat. No. 4,453,449 describes a hold down apparatus having a sleeve with a plurality of fingers, the reactive length of which is varied in order to provide any predetermined engaging and release force to detents which engage a groove in a shaft that is attached to a missile to form a passive hold down apparatus which is reusable.

Schott, U.S. Pat. No. 4,616,952 describes a shaft coupling joining together a coupling sleeve and a power takeoff shaft, wherein a plurality of locking bodies guided in radial openings in the coupling sleeve engage within an annular groove in the power takeoff shaft to axially retain the members coupled together. An axially movable lock ring holds the locking bodies in engagement within the annular groove and when in the released position a gripping sleeve axially fixed with the lock ring, but rotatable relative thereto extending about the coupling sleeve, is engaged within the radial openings of the coupling sleeve to hold the coupling in the released position. The gripping sleeve is formed with an annular part extending axially inwardly of the gripping sleeve, a radially inwardly directed hooked projection provided on the annular part and a plurality of longitudinally extending slots uniformly circumferentially distributed on the annular part dividing it into a plurality of individual radially inwardly extending locking brackets having hooked projections formed thereon engaging within the radial openings. The quantity of the locking brackets provided is divisible by the quantity of the radial openings and the width of the locking brackets in the circumferential direction corresponds to no more than half the corresponding width of an opening.

Suzuki, U.S. Pat. No. 4,645,372 describes a power transmitting coupling includes a hub member such as a yoke and a shaft such as a splined shaft fitted therein axially slidably but nonrotatably relative to each other, and detent balls accommodated in the hub member and. partially extending into a ball setting groove of the shaft for preventing the shaft from removing from the hub member. According to the invention, the coupling comprises slide means slidable on the hub member into a ball holding position where the detent balls partially extending into the ball setting groove of the shaft are held and a ball non-holding position where the detent balls are not held, spring means for urging the slide means in one direction, holding position holding means for holding the slide means at the ball holding position in cooperation with the spring means, and non-holding position holding means for holding the slide means at the ball non-holding position in cooperation with the spring means but releasing the slide means when the detent balls move outwardly, thereby enabling the shaft and the hub member to be connected and disconnected only by once sliding the slide means without holding the slide means by a hand of an operator during the connecting and disconnecting operation.

Finnefrock, U.S. Pat. No. 4,865,485 describes a socket extension with a release mechanism for an included lock ball wherein the release mechanism is positioned on side of the lock ball and an included safety wedge is positioned on the opposite side of the lock ball aligned with the release mechanism. The safety wedge is resiliently biased against the lock ball by a captured spring therebehind and the safety wedge being displaced upon displacement of the release mechanism to disengage said lock ball from an associated socket.

Stillwagon, U.S. Pat. No. 4,900,182 describes a lock and release apparatus comprising an integrally cooperating bar and collar combination which provides a variety of gripping and releasing arrangements; wherein the bar of such combination defines a plurality of circumferentially alternating surfaces, including at least one flat surface and one arcuate surface; and, wherein the collar of such combination defines a ball and cam relationship which cooperates with the arcuate surface of the bar to provide a gripping action between the bar and collar, which is releasable by variety of arrangements made functional by the present invention.

Flux, U.S. Pat. No. 4,988,248 describes a plug-in connector device comprising a ring-like head portion and a hollow shank. The shank has locking balls which can be held to project outwardly of the shank in a locked condition of the device, and can also move to a retracted position under the control of an axially slidable probe, the movement of which is controlled by an actuator lever on the head portion which can only be moved to release the locking balls from their locked condition on a separate manipulation of a second lever, or in other embodiments a safety catch button, also mounted on the head portion.

Fox III et al, U.S. Pat. No. 5,390,571 describes a shaft drive which includes a push button locking mechanism for releasingly locking the shaft drive to the attachment cavity of an attached tool. The locking mechanism can be used to positively couple one tool, such as a wrench drive or another tool. A push button includes an inner end having a concave surface that interacts with the convex surface of a sliding locking bolt inside the shaft such that depression of the button moves the locking bolt to a release position. A spring in the locking bolt bore biases the bolt in its locking position.

Quiring, U.S. Pat. No. 5,398,946 describes a chuck device having a one-step lock and release mechanism for conveniently coupling a power bit to a drill having a Jacobs-style chuck. The chuck device includes a body having a centrally-positioned bore which is adapted to receive the power bit shank. The power bit shank includes a circumferentially-extending groove which is positioned inside the bore. The body has an inclined cam channel which includes an aperture for communicating with the bore. The body further includes a longitudinally-extending slot communicating with the inclined cam channel. A detent ball is disposed within the inclined cam channel for partial penetration through the aperture for engaging the circumferentially-extending groove of the power bit shank. A spring having an end encircles the body where the end is slidably positioned within the slot for biasing the detent ball rearwardly along the inclined cam channel during the unlocking and withdraw of a power bit from the chuck device. The position of the spring is confined on the body by a retaining ring positioned proximate to the inclined cam channel and by a sleeve which encircles a portion of the body. The retraction of the sleeve in a rearward direction compresses the spring and rearwardly biases the spring end within the slot for movement of the detent ball from locking engagement to the circumferentially-extending groove. Release of the sleeve permits the expansion of the spring and the biasing of the sleeve and detent ball in a forward direction for locking engagement to a power bit.

Ferreol-Ragotin, U.S. Pat. No. 5,458,431 describes a modular franking machine which comprises first and second modules. A module assembly device holds the first module in alignment with the second module. It comprises at least one projecting shaft fixed to the first module and a sheath in the second module. The shaft is inserted in the sheath by translatory movement. The shaft is locked in position relative to the sheath when inserted in it. The locking system comprises a piston mobile axially inside the shaft to displace a retractable member housed inside the shaft so that it projects towards the exterior of the shaft and an opening in sheath to receive the projecting member in order to immobilize the shaft in the sheath.

Crainich, U.S. Pat. No. 5,464,300 describes a medical instrument including a handle for manipulating the instrument, a tool head, and a tube element for joining the handle and the tool head, the tube element having a first end and a second end, a first coupling for releasably coupling the first end of the tube element and the handle, and a second coupling for releasably coupling the second end of the tube element and the tool head, whereby the tool head, tube element and handle are all readily separable from each other.

Dobbins, U.S. Pat. No. 5,518,335 describes a lock-up device for a firearm which utilizes a ball and cam arrangement to interlock two members. The interlocked members include ball arrangement surfaces which are curved so that a substantial portion of the ball surface is in contact with the engagement surfaces. The lock-up device disposed in a firearm absorbs recoil forces and utilizes the absorbed recoil force to cycle the firearm.

Chow, U.S. Pat. No. 5,531,140 describes socket wrench extension including an axial bore for receiving a rod and including an opening and an orifice for receiving a ball and an actuator. The actuator includes a tapered surface for moving the rod inward of the axial bore. The rod includes an aperture for engaging with the actuator and a cavity for receiving the ball. A spring biases the rod to move the ball partially outward of the opening so as to engage with a socket member. The ball is received in the cavity when the rod is moved inward by the actuator. The elements may be easily assembled in the extension.

Butkovich et al, U.S. Pat. No. 5,658,087 describes a locking mechanism for releasably fixing an externally splined power take-off shaft to an output shaft of ofthighway equipment such as a tractor. The output shaft has a hollow, internally splined hub portion adapted to axially receive the externally splined power take-off shaft to prevent relative rotational movement between the power take-off and output shafts. The locking mechanism includes a locking member supported within a radial opening in the power take-off shaft so as to be radially movable between an outer locking position and an inner locking position. In the outer locking position, the locking member is engagable with a recess formed in the hub portion of the output shaft to prevent relative axial movement between the power take-off shaft and the output shaft. In the inner unlocking position, the locking member is disengaged from the recess in the output shaft to permit such relative axial movement. An elongated actuator is positioned within an inner bore of the power take-offshaft and has a cam surface thereon. The actuator is movable between a first position in which the actuator operably maintains the locking member in its locking position, and a second position which permits radial movement of said locking member to its unlocking position. Upon return of the actuator to the first position, the cam surface operably engages the locking member to move the locking member to its locked position.

Pace, U.S. Pat. No. 5,692,851 describes a connector for an elongated member which is composed of a male part and a female part. The female part is fixedly mounted onto an end of an elongated member with the male part being fixed onto a separated structure or vice versa. The male part includes a fluid operated piston, which is to be supplied fluid pressure from a remote source. Axially pressing of the female member in contact with the male member will result in the connector being located in a locked relationship. Application of the fluid pressure from the remote source will cause the connector to move to an unlocked relationship permitting locating of the female part in a spaced apart relationship from the male part.

Whittington et al., U.S. Pat. No. 6,007,268 describes an axial and radial locking release collar adapted to be axially received on and to be removably fixed at any selected location along the length of an elongated shaft and radially locked in at least one direction around the shaft. The release collar includes an axially movable sleeve. Moveable balls are cammed into frictional engagement with the shaft. A tension ring includes angled segments removed from the inner surface thereof such that said movable balls are held in the angled segments to prevent radially movement around the shaft. The release collar may also be easily slid onto a threaded shaft and locked into place.

The prior art teaches several devices such as struts, shafts, and buttons which may be released by the use of ball bearings and other moveable engagement elements. However, the prior art does not teach that an axle may be formed by the engagement of two axle halves joined by radially positionable ball bearings which are controlled by an axially movable control rod accessed from one end of the axle and wherein the two halves may be forcefully separated once the locking means is released, by a biasing element. The present invention fulfills these needs and provides further related advantages as described in the following summary.

SUMMARY OF THE INVENTION

The present invention teaches certain benefits in construction and use which give rise to the objectives described below.

The present invention provides an axle made-up of a left and a right axle halves which axially engage to form a completed axle assemble for supporting a roller skate wheel or other rotating member. A control rod is positioned and enabled for axial translation within the axle and may be moved by physical contact with the rod through an access hole at one end of the axle. A spring normally positions the control rod so that a set of ball bearings mounted within radial holes in the axle are forced into an outward position for engaging the axle halves to form a unitary unit. When the control rod is translated against spring tension, however, the bearings are able to move radially inwardly into the axle so as to disengage the axle halves for quick disassembly for replacing a wheel or other need. The axle provides a spring bias enabled for forcefully separating the axle halves once released. A threaded cap is adjustable in position to moderate the separating force.

A primary objective of the present invention is to provide a wheel axle having advantages not taught by the prior art.

Another objective is to provide such an axle capable of being removed from its mount by depressing on a control rod from one end of the axle.

A further objective is to enable the axle to be assembled by merely pressing the two halves of the axle together while depressing the control rod.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
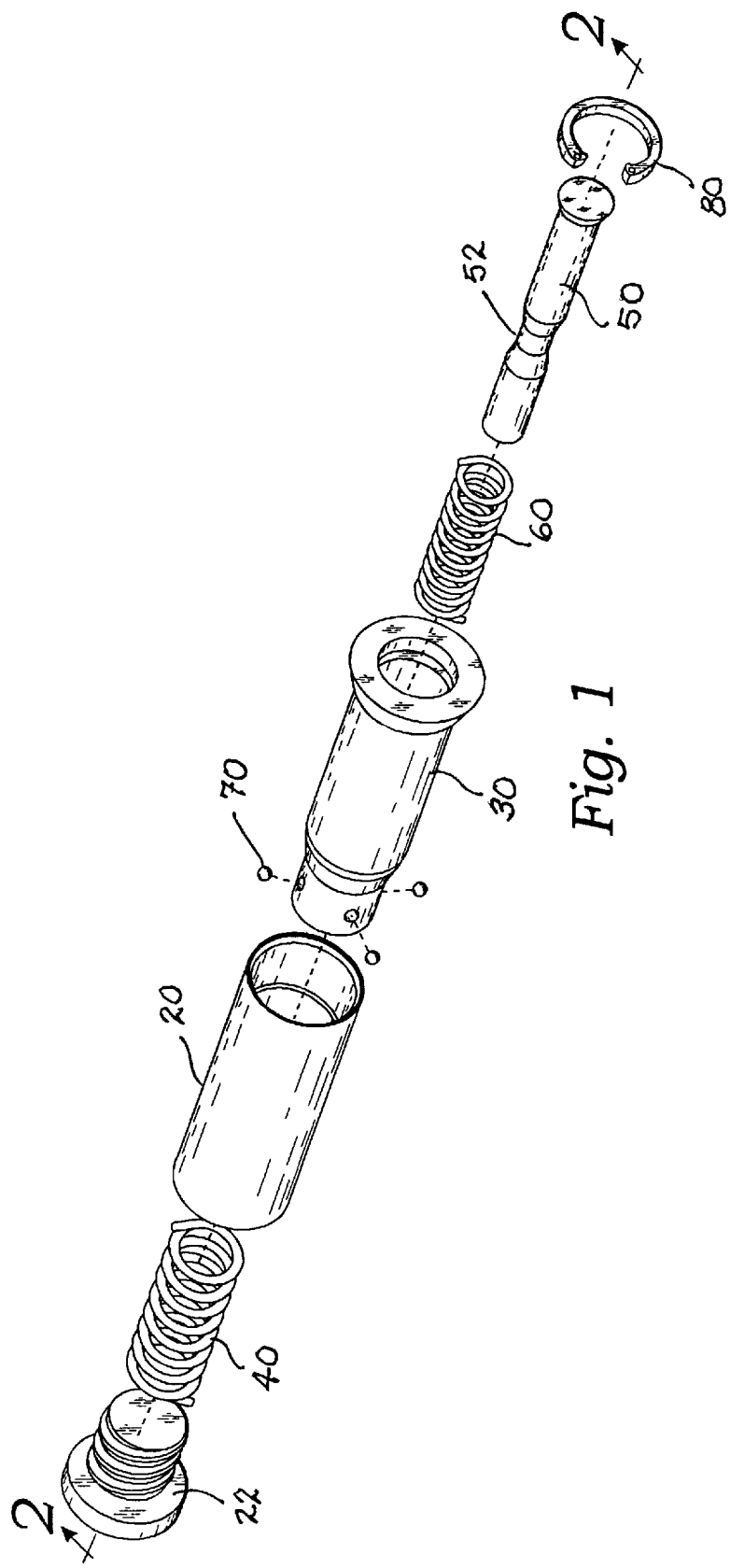
FIG. 1 is an exploded perspective view of the preferred embodiment of the present invention.
Figure 2:
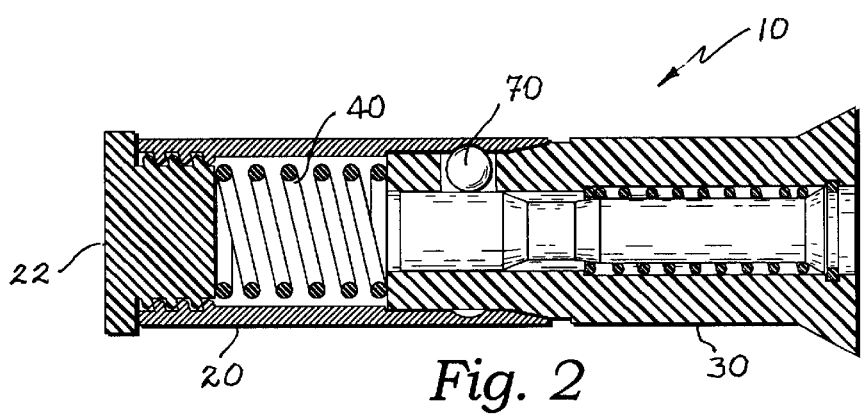
FIGS. 2–4 are sectional view taken along line 2—2 of FIG. 1 and showing the invention as fully assembled, control rod depressed, and axle portions separated respectively.
Figure 3:
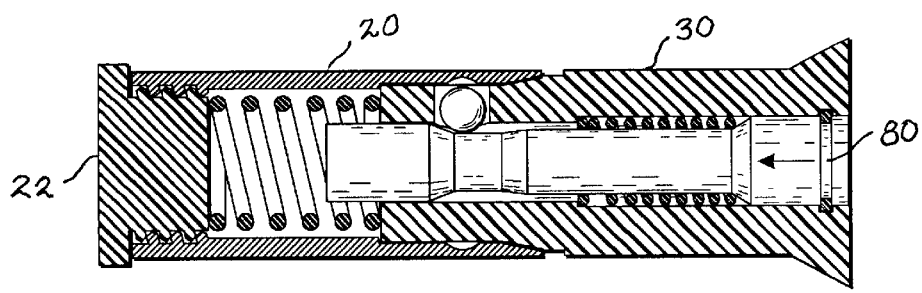
Figure 4:
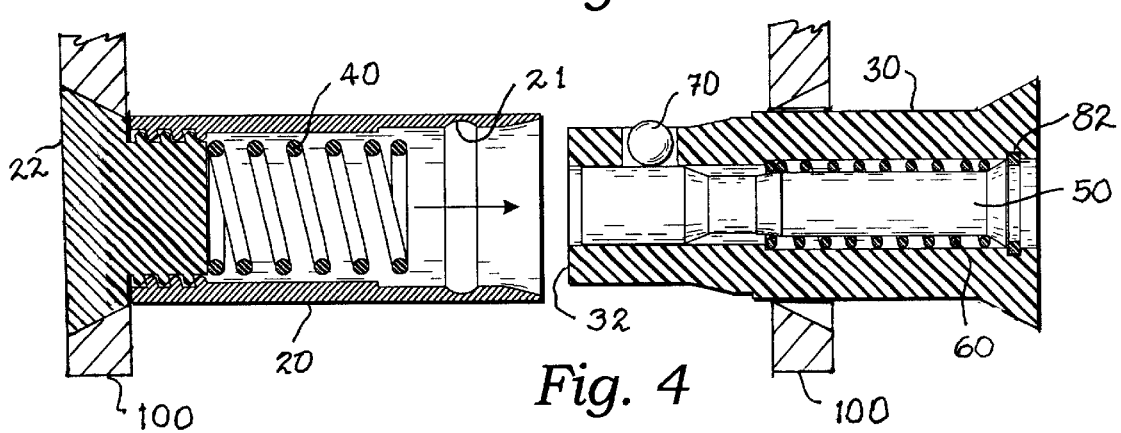

The above described drawing figures illustrate the invention, a control-rod actuated axle apparatus shown in a sectional view in FIG. 2 and referenced by numeral 10. The apparatus comprises a control-rod actuated axle comprising a pair of cylindrical axle portions 20 and 30, with one of the axle portions 20 adapted for receiving the other of the axle portions 30 for mutual engagement in unitary axial alignment as shown in FIG. 2. As can be seen in FIGS. 2–4, the adaptation of the one axle 20 comprises an interior diameter suitable for receiving the other axle portion 30. The fit between these two parts is a tight tolerance sliding fit. When so engaged, as shown in FIG. 2, a spring potential energy is imparted to a first biasing means 40, preferably a coil spring, within the one of the axle portions 20 compresses the biasing means 40. A control rod 50 is engaged within the other of the axle portions 30 and positioned by a second biasing means 60, preferably, again, a coil spring, as shown. The control rod forces a plurality of locking elements 70, preferably ball bearings, into radial positions for locking the pair of axle portions 20, 30 as shown in FIG. 2. For this purpose, the interior surface of the one axle portion 20 has an annular internal groove 21. The control rod 50 is axially movable, as shown by the arrow in FIG. 3, for positioning a reduced diameter portion 52 of the control rod 50 in a position enabling the locking elements 70 to move inwardly, radially, to unlock the axle portions 20, 30 so they may be separated as shown in FIG. 4. The first biasing means 40 acts to project the axle portions 20, 30 apart by releasing the first spring potential energy as shown by the arrow in FIG. 4.

A retaining means 80 such as a common spring tempered retaining ring, is engaged within the other of the axle portions 30 for retaining the second biasing means 60 therewithin. This is clearly shown in FIGS. 2 and 4 where a head 54 of the control rod 50 is sized for abutting the retaining means 80 so that it cannot be removed from the apparatus without first removing the retaining means 80. The retaining means 80 is preferably fitted into a retaining slot 82 within the other of the axle portions 30 as shown in FIG. 4.

The one of the axle portions 20, preferably terminates with a cap 22 threadedly joined thereto and axially positionable therein. The cap 22 engages the first biasing means 40 for adjustable compression. This compression also acts to prevent the cap 22 from rotating after being set at an appropriate tension of the biasing measn 40. The internal surface 24 of the cap 22 presses against the first biasing means 40 at its left end as shown. The right end of the first biasing means 40 presses, in turn, against one end 32 of the other of the axle portions 30. Thus, when the two axle portions 20, 30 are no longer engaged, they are projected apart. This is to great advantage in certain applications such as with roller skates where the terminal ends of the axle may use countersunk type flared flanges, wherein it is difficult to remove the axle portions even when they are disengaged. This is illustrated in FIG. 4 where two side portions of a skate frame 100 is shown with the apparatus 10. The skate frame 100 may be considered an important element of the present invention as the frame 100 works with the apparatus 10 to provide an improved skate wheel mounting assembly.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A control-rod actuated axle apparatus comprises a pair of cylindrical axle portions with one of the axle portions adapted for receiving the other of the axle portions for mutual engagement in unitary axial alignment, thereby imparting a first potential energy to a first biasing means within the one of the axle portions; and a control rod engaged within the other of the axle portions and positioned by a second biasing means for forcing at least one locking elements into positions for locking the pair of axle portions; the control rod axially movable for positioning a reduced diameter portion of the control rod for enabling the locking elements to unlock the axle portions for separation thereof, the first biasing means forcing the axle portions apart by releasing the first potential energy thereof; further comprising a retaining means engaged within the other of the axle portions for retaining the second biasing means therewithin; wherein the retaining means is a retaining ring of a spring temper material, removably fitted into a circular retaining slot within the other of the axle portions.

2. The apparatus of claim 1 wherein the plurality of locking elements are ball bearings.

3. The apparatus of claim 1 wherein the one of the axle portions terminates with a cap threadedly joined thereto and axially positionable therein, the cap engaging the first biasing means for adjustable compression thereof.

* * * * *